(12) United States Patent
Senda

(10) Patent No.: US 7,977,812 B2
(45) Date of Patent: Jul. 12, 2011

(54) ELECTRIC POWER SYSTEM FOR VEHICLE

(75) Inventor: Takashi Senda, Toyota (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 12/274,449

(22) Filed: Nov. 20, 2008

(65) Prior Publication Data

US 2009/0127930 A1    May 21, 2009

(30) Foreign Application Priority Data

Nov. 20, 2007   (JP) .................. 2007-300471

(51) Int. Cl.
*B60L 1/00* (2006.01)
(52) U.S. Cl. ...................................... 307/10.1
(58) Field of Classification Search .................. 307/10.1
See application file for complete search history.

(56) References Cited

FOREIGN PATENT DOCUMENTS

| JP | 55-52779 | 12/1980 |
|---|---|---|
| JP | 6-296332 | 10/1994 |
| JP | 2002-176704 | 6/2002 |
| JP | 2002176704 | * 6/2002 |
| JP | 2006-101588 | 4/2006 |
| JP | 2007-159236 | 6/2007 |
| JP | 2007159236 | * 6/2007 |

OTHER PUBLICATIONS

Japanese Office Action dated Oct. 29, 2009, issued in corresponding Japanese Application No. 2007-300471, with English translation.

* cited by examiner

*Primary Examiner* — Michael Rutland Wallis
(74) *Attorney, Agent, or Firm* — Nixon & Vanderhye P.C.

(57) ABSTRACT

An ECU in an electric power system for a vehicle controls a DC-DC converter so that an alternator transmits a residual generated electric power to a sub battery while a terminal voltage of a main battery is maintained within an optimally specified voltage range. This residual generated electric power is obtained by subtracting from a maximum generating electric power of the alternator an electric power to be consumed by electric loads and an electric power with which the main battery is charged. This can suppress any fluctuation of the voltage of electric power of the electric power system, namely, the output voltage of the alternator and the voltage of the main battery, and perform a maximum regenerative electric power generation. The sub battery is efficiently changed with the regenerative electric power.

11 Claims, 8 Drawing Sheets

TRANSITION CONDITIONS

| SIGN | JUDGMENT | SIGN | JUDGMENT |
|---|---|---|---|
| A | IG-ON | F | INITIATING REGENERATIVE ELECTRIC POWER GENERATION |
| B | IG-OFF | G | LOW LEVEL OF Li BATTERY (SUB BATTERY) |
| C | INITIATING Eng ROTATION | H | DETERMINING ABNORMAL |
| D | STOPPING Eng ROTATION | I | IG-OFF |
| E | COMPLETION OF REGENERATIVE ELECTRIC POWER GENERATION | | |

STATE TRANSITION DIAGRAM FOR
ELECTRIC POWER CONVERTER

ELECTRIC POWER SYSTEM FOR VEHICLE

CROSS-REFERENCE TO RELATED APPLICATION

This application is related to and claims priority from Japanese Patent Application No. 2007-300471 filed on Nov. 20, 2007, the contents of which are hereby incorporated by reference.

BACKGROUND OF THE INVENTION

1. Field of the Invention

The present invention relates to an electric power system for a vehicle equipped with a plurality of electric power storage devices such as rechargeable batteries capable of supplying different terminal voltages to various types of electrical components as electrical loads mounted to a vehicle.

2. Description of the Related Art

There is known an electric power system for a vehicle. The electric power system is equipped with a plurality of electric power storage devices such as a main battery and a sub battery which are rechargeable. Each of the electric power storage devices outputs a different terminal voltage. Such an electric power system is comprised of an alternator, various electrical loads, and electric power storage devices such as a main battery and a sub battery. The alternator is driven by a rotary power transmitted from an internal combustion engine and controlled to generate en electric power of a specified target voltage. The alternator supplies the generated electric power to the main battery and various types of electrical loads.

The sub battery is electrically connected to the main battery through an electric power converter for a bi-directional transmission in order to transmit the electric power between them in bi-directions. Hereinafter, this type of the electric power system for a vehicle will be referred to as the "dual battery type electric power system for a vehicle".

The Japanese patent JP 3465293 as a conventional technique has disclosed such a dual battery type electric power system for a vehicle. JP 3465293 has proposed that a main battery is composed of an electric double-layer capacitor (EDLC) and is charged with a constant current supplied from an alternator, and the alternator also generates a regenerative electric power using a regenerative brake during a vehicle speed reduction or braking in addition to during forward driving of the vehicle. During a period of time when the vehicle is moving other than the vehicle speed reduction, the electric power stored in the sub battery is, in preference to the electric power stored in the main battery, supplied to the various electrical loads.

The dual battery type electric power system for a vehicle disclosed in JP 3465293 adopts a constant current regenerative method of charging the sub battery during a period of time of a vehicle speed reduction. The electric power (hereinafter, referred to as the "residual generated electric power"), which the alternator can supply to the sub battery through an electric power converter for a bi-directional transmission, is obtained by subtracting an electric power to be consumed by both the electrical loads and the main battery from the maximum generated electric power of the alternator. However, the magnitude of the residual generated electric power generally fluctuates according to various operational conditions of the alternator, the electric loads, and the main battery.

For example, when a charging current for charging the sub battery is larger than a current of the residual generated electric power, the main battery discharges the electric power stored therein in order to compensate the difference of those electric power. As a result, the terminal voltage of the main battery is decreased.

On the other hand, when a charging current for charging the sub battery is smaller than a current of the residual generated electric power, it becomes difficult to obtain the effect of economy in power consumption by generating the regenerative electric power during a vehicle speed reduction or braking.

A large voltage drop of the main battery causes a terminal voltage drop to be supplied to the electrical loads which are electrically connected to the main battery in addition to wasteful discharging of the main battery. Thus, the voltage drop of the main battery will cause head lamps of a vehicle to decrease its intensity of illumination, and the speed of windshield wipers of the vehicle to be varied or drop. Because this gives the driver of the vehicle a sense of discomfort when driving, it must be avoided.

SUMMARY OF THE INVENTION

It is an object of the present invention to provide an electric power system for a vehicle equipped with a plurality of electric power storage devices such as a main storage device and a sub storage device which are rechargeable. The electric power system is capable of suppressing a voltage drop of a terminal voltage of the main battery and of enhancing the effect of economy in power consumption by generating a regenerative electric power during a vehicle speed reduction.

To achieve the above purposes, the present invention provides an electric power system for a vehicle. The electric power system performs a regenerative electric power generation (or a regenerative generation) using a regenerative brake during a vehicle speed reduction and a regenerative electric power discharging (or a regenerative discharging) after the vehicle speed reduction. The electric power system for a vehicle has an alternator, a main storage device, a sub storage device, an electric power converter, and a control device.

The alternator is comprised of a rectifier and a regulator having a field current control switch. The alternator is driven to generate an electric power by a rotary power supplied from an internal combustion engine of a vehicle. An output voltage of the alternator is converged to an adjusting voltage by a feedback control of a field current duty cycle as a duty ratio of the field current control switch. The main storage device is charged with the electric power generated by the alternator. The main storage device discharges the electric power to electrical loads. The sub storage device is charged with a regenerative electric power which is generated by the alternator using a regenerative brake during a vehicle speed reduction or a vehicle braking. The sub storage device discharges the stored regenerative electric power after completion of the vehicle speed reduction. The electric power converter for a bi-directional transmission transmits the electric power between the main storage device and the sub storage device which are electrically connected through the electric power converter.

The control device controls an operation of the alternator and the electric power converter so that the sub storage device is charged with the regenerative electric power generated by the alternator during the vehicle speed reduction, and the sub battery discharges the stored regenerative electric power to the electric loads through the electric power converter after completion of the vehicle speed reduction.

During the regenerative electric power generation (or during the regenerative generation), the control device instructs the electric power converter to transmit a residual generated electric power in a forward electric power transmission from the alternator to the sub storage device while a terminal voltage of the main storage device is maintained within a specified voltage range, where the residual generated electric power is obtained by subtracting an electric power to be consumed by the electrical loads and an electric power with which the main storage device is charged from a maximum generated electric power of the alternator.

In addition, during the regenerative electric power discharging (or during the regenerative discharging), the control device instructs the electric power converter to transmit the electric power in a backward electric power transmission from the sub storage device to the main storage device so that the electric power generated by the alternator is not more than a specified value while the terminal voltage of the main storage device is maintained within a specified voltage range.

Through the description of the present invention, the electric power transmission from the main storage device to the sub storage device through the electric power converter for a bi-directional transmission will be referred to as the "forward electric power transmission or forward transmission" for short. On the other hand, the electric power transmission from the sub storage device to the main storage device through the electric power converter for a bi-directional transmission will be referred to as the "backward electric power transmission or backward transmission" for short It is possible to form each of the main storage device and the sub storage device with an electric double-layer capacitor instead of a battery such as a nickel metal hydride secondary battery.

In the electric power system according to the present invention, namely, in the electric power system of a dual battery type composed of the main storage device and the sub storage device, the control device instructs the electric power converter to transmit the electric power to the sub storage device from the basic electric power system comprised of the alternator, the main storage device and the electric loads. The electric power to be transmitted corresponds to the residual electric power to be generated during the generative electric power generation This can realize the regeneration of a kinetic energy which is generated at each time of the vehicle speed reduction with a substantially maximum regenerative electric power generation function of the electric power system for a vehicle regardless of any operation fluctuation of the electrical loads and the main storage device. When compared with conventional techniques, the present invention provides the electric power system capable of decreasing the fuel consumption with a simple structure and a small size while preventing the regenerative electric power generation to decrease. Further, the present invention provides the electric power system capable of avoiding an excess voltage drop of the terminal voltage of the basic electric power system over an allowable voltage level, where such an excess voltage drop of the terminal voltage of the basic electric power system is caused when the electric power converter performs the transmission of the electric power of an excess amount in the forward electric power transmission.

In the electric power system according to the present invention, the control device controls the backward electric power transmission of the electric power converter so that the electric power generated by the alternator is not more than the specified value, preferably, equal to zero while the terminal voltage of the basic electric power system is maintained within the specified range. This control enables the sub storage device to rapidly charge the stored regenerative electric power, and as a result, the sub battery after completion of the rapid discharging can be charged with a future regenerative electric power generation.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
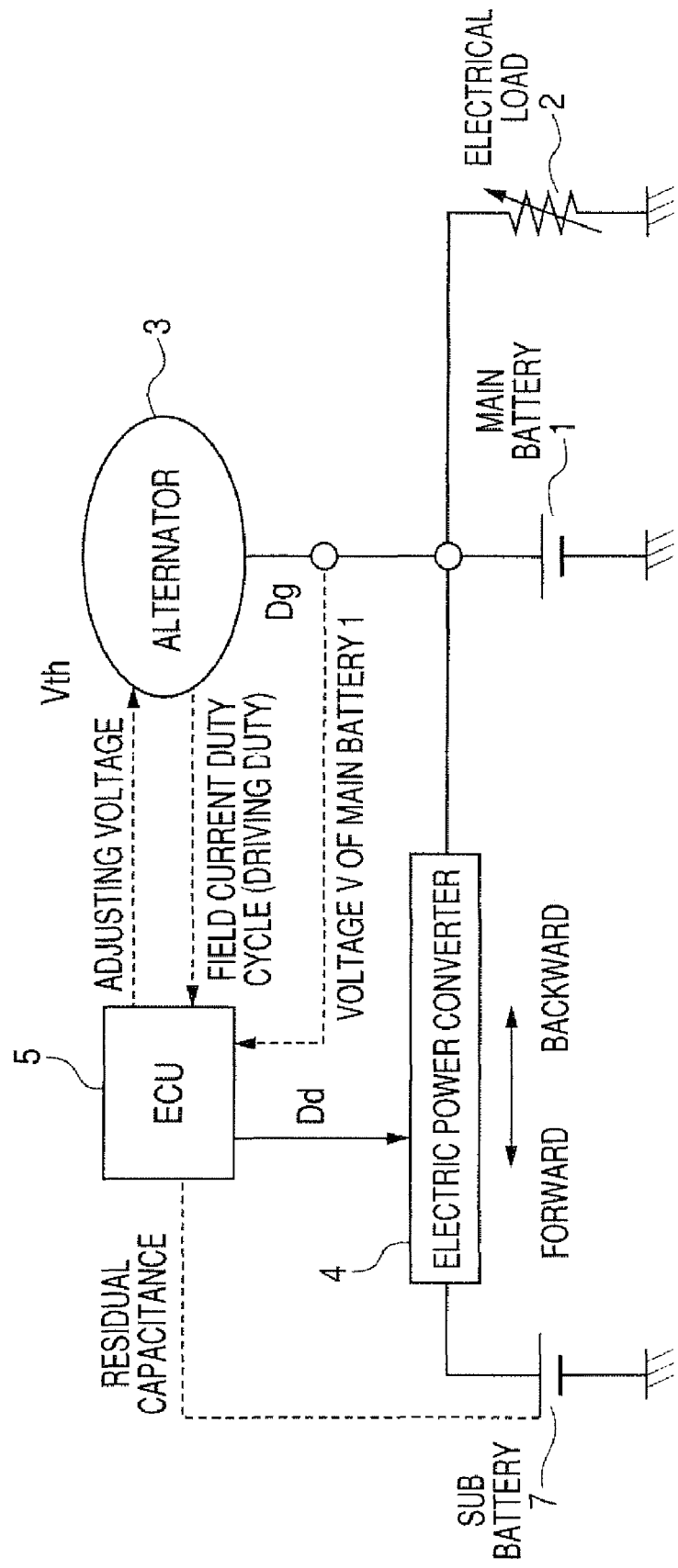
FIG. 1 is a block diagram showing a schematic circuit structure of an electric power system for a vehicle according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the electric power system for a vehicle according to an embodiment of the present invention with reference to FIG. 1 to FIG. 8.
(Circuit Structure)

FIG. 1 is a block diagram showing a schematic circuit structure of the electric power system for a vehicle according to the embodiment of the present invention.

The electric power system according to the embodiment is comprised mainly of an on-vehicle alternator 3 (hereinafter, referred to as the "alternator 3" for short), a main battery 1 as a main electric power storage device (or a main storage device for short), a sub battery 7 as a sub electric power storage device (or a sub storage device for short), an electric control unit (ECU) 5 as a control device, and a DC-DC converter 4 as an electric power converter for a bi-directional electric power transmission. The main battery 1 and the sub battery 7 are rechargeable batteries.

The alternator 3 mounted on a vehicle is driven by a rotary power of an internal combustion engine (not shown) to generate an electric power. The alternator 3 supplies the generated electric power to the main battery 1 to charge it, and also supplies it to various power to various types of electrical components as electrical loads. In general, a plurality of electrical loads is mounted to a vehicle, such as lamps, a starter, an air conditioning system, wipers, and a radio. FIG. 1 shows one electrical load 2 for brevity. The electrical loads consume the electric power supplied from the alternator 3, the main battery 1, and the sub battery 7.

The main battery 1 discharges the electric power stored therein to the electrical load 2 when the voltage of an electric power generated by the alternator 3 is lower than the charging voltage of the main battery 1.

The alternator 3 is driven to generate a regenerative electric power by a kinetic energy transmitted from the internal combustion engine (not shown) using a regenerative brake during a vehicle speed reduction.

The alternator 3 is equipped with a regulator and a rectifier (which are omitted from drawings). The regulator controls the alternator 3 to feed back a field current so that a terminal voltage of the main battery 1 is converged to a specified adjust voltage (usually, 13 to 15 volts).

In order to perform the feed-back control for the field current of the alternator 3, like a conventional feed-back control, the electric power system according to the embodiment controls a built-in field current on-off switch (or a field current control switch for short) of the regulator to turn on and off according to a comparison result between the terminal voltage of the main battery 1 and the specified adjusting voltage of the main battery 1.

The duty cycle of this built-in field current on-off switch generated as a result of the feed-back control will also be referred to as the "field current duty cycle" through the following description.

The sub battery 7 as the sub electric power storage device is composed of a lithium (Li) secondary battery (or a lithium rechargeable battery). Instead of using such a lithium secondary battery, it is possible to make the sub battery 7 with a nickel metal hydride secondary battery or an electric double-layer capacitor.

The DC-DC converter 4 as an electric power converter for a bi-directional transmission performs the electric power conversion between a basic electric power system and the sub battery 7. This basic electric power system is comprised of the main battery 1, the electrical load 2, and the alternator 3.

For example, the DC-DC converter 4 is comprised of a transformer type DC-DC converter or a chopper type DC-DC converter. In general, the DC-DC converter for transmitting an electric power in bi-directions (forward and backward) has a built-in switching element and is capable of adjusting a magnitude and a transmission direction of the electric power to be transmitted by controlling a PWM (Pulse Width Modulation) duty ratio of the built-in switching element. The built-in switching element is controlled to turn ON and OFF by a specified carrier frequency.

Because such a type of the DC-DC converter is a well-known device, a detailed explanation thereof is omitted here.

The electric power system of a dual battery type according to the embodiment which is composed of the main battery 1 and the sub battery 7 is basically equal in a circuit configuration to a conventional electric power system of a dual battery type. However, the ECU 5 as the control device is an important component to form the electric power system according to the embodiment and is different in functions and effects from the control device of the conventional electric power system.

A description will now be given of the feature and effects of the ECU 5 (or the control device) of the electric power system according to the present invention when compared with those of the control device of a conventional electric power system.

In particular, the ECU 5 as the control device in the electric power system according to the embodiment controls at least one of the alternator 3 and the DC-DC converter 4 based on input information when the alternator 3 generates a regenerative electric power generation (or a regenerative generation) using a regenerative brake during a vehicle speed reduction or during vehicle braking, and in addition when the regenerative electric power stored is discharged.

(First Example of the Routine of Controlling the Regenerative Electric Power Generation Using a Regenerative Brake During a Vehicle Speed Reduction)

Figure 2:
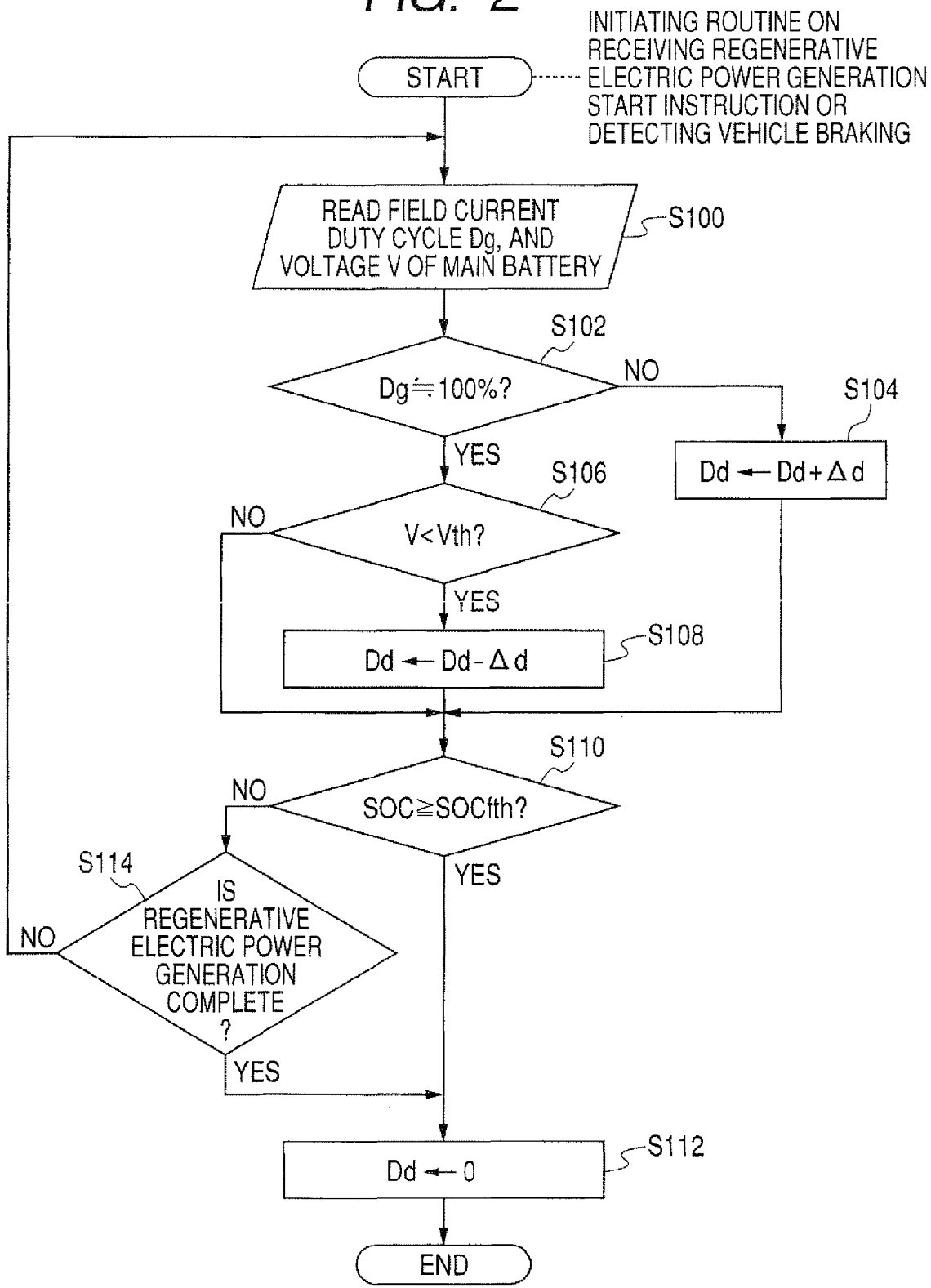
FIG. 2 is a flow chart of a routine of controlling a regenerative electric power generation using a regenerative brake during a vehicle speed reduction performed by the electric power system according to the embodiment of the present invention.

FIG. 2 is a flow chart showing the routine of controlling the regenerative electric power generation using a regenerative brake when a vehicle speed is reduced.

As mentioned before, the alternator 3 generates the electric power under the feed-back control by turning the built-in field current on-off switch on and off based on a comparison result between the voltage V of the basic electric power system and the specified adjusting voltage Vth. The basic electric power system is comprised of the main battery 1, the electrical load 2, and the alternator 3, the voltage V of the basic electric power system is a terminal voltage of the main battery 1 or the output voltage of the alternator 3. The specified adjusting voltage Vth is determined in advance. This means that the alternator 3 generates its maximum electric power when the duty cycle of this built-in field current on-off switch, namely, the field current duty cycle is just 100%.

As shown in FIG. 2, the routine of controlling the regenerative electric power generation is performed as follows.

First, the routine for controlling the regenerative electric power generation shown in FIG. 2 is initiated by inputting a vehicle braking control signal or an instruction signal to start the regenerative electric power generation. This instruction signal to start the regenerative electric power generation is determined by another routine (not shown). This instruction signal is determined by another routine (not shown) based on the vehicle braking control signal.

The ECU 5 inputs the field current duty cycle Dg of the alternator 3 and the terminal voltage V of the main battery 1 (step S100). The alternator 3 regularly outputs the field current duty cycle Dg to the ECU 5.

The ECU 5 judges whether or not the field current duty cycle Dg is almost equal to 100% (step S102).

When the judgment result at step S102 indicates that the field current duty cycle Dg is not almost equal to 100%, the ECU 5 judges that the alternator 3 does not perform its maximum electric power generation. The ECU 5 then increases the PWM duty ratio Dd of the built-in switching element of the DC-DC converter 4 as the electric power converter by ΔD (step S104). This PWM duty ratio Dd indicates the duty when the DC-DC converter 4 performs a forward electric-power transmission. The increment of the PWM duty ratio Dd increases the amount of the electric-power transmitted in the forward direction by the DC-DC converter 4, and thereby decreases the terminal voltage V of the basic electric power system (which is the terminal voltage of the main battery 1 or the output voltage of the alternator 3). The alternator 3 increases the field current duty cycle Dg in order to promote the regenerative electric power generation operation.

When the judgment result indicates that the field current duty cycle Dg is almost equal to 100% (step S102), the ECU 5 judges that the alternator 3 has already performed its maximum electric power generation. The ECU 5 judges whether or not the voltage V of the basic power source system is smaller than the specified adjusting voltage Vth (step S106).

When the judgment result indicates that the voltage V of the basic electric power source is smaller than the specified adjusting voltage Vth (step S106), the ECU 5 judges that the basic power source system transmits to the sub battery 7 the electric power which is in excess of the residual generated electric power of the basic electric power system. The ECU 5 then decreases the PWM duty ratio Dd of the built-in switching element of the DC-DC converter 4 by a specified value ΔD in order to control the DC-DC converter 4 to decrease the electric power transmitted in the forward direction (step S108). The operation flow goes to step S110.

The ECU 5 controls the DC-DC converter 4 so that decreasing the PWM duty ratio Dd decreases the electric power transmitted in the forward direction, and increasing the PWM duty ratio Dd increases the electric power transmitted in the forward direction.

Decreasing the electric power transmitted in the forward direction maintains the voltage V of the electric power system to be the specified adjusting voltage Vth.

On the other hand, when the judgment result indicates that the voltage V of the basic electric power source is not less than the specified adjusting voltage Vth (step S106), the ECU 5 judges that it is not necessary to decrease the magnitude of the electric power to be transmitted in the forward direction because the electric power transmitted in the forward direction is not large (step S108). The operation flow then goes to step S110.

In step S110, the ECU 5 judges whether or not a state of charge (SOC) of the sub battery 7 reaches the maximum value SOCfth. When the judgment result indicates that the SOC of the sub battery 7 has already reached the maximum value SOCfth, the ECU 5 sets the PWM duty ratio Dd of the built-in switching element of the DC-DC converter 4 to zero in order to stop the electric power transmission in the forward direction (step S112). The ECU 5 then completes the execution of the routine shown in FIG. 2.

On the other hand, when the judgment result indicates that the SOC of the sub battery 7 does not reach the maximum value SOCfth, the ECU 5 judges whether or not receiving a vehicle braking completion signal or a regenerative electric power generation completion instruction (step S114).

When the judging result indicates the electric power system to stop the regenerative electric power generation, the ECU 5 sets the PWM duty ratio Dd of the built-in switching element of the DC-DC converter 4 to zero. The ECU 5 then completes the execution of the routine shown in FIG. 2.

At step S114, when the judgment result indicates to continue the regenerative electric power generation control, the operation flow returns to step S100. The regenerative electric power generation control is then restarted.

By the way, the regenerative electric power generation control has a possibility that the voltage V of the electric power system exceeds the specified adjusting voltage Vth (step S106). In this case, because the field current duty cycle Dg of the alternator 3 is decreased by the feedback control of the field current duty cycle Dg, the ECU 5 adjusts the terminal voltage V of the main battery 1 to become equal to the specified adjusting voltage Vth. For example, the terminal voltage V of the main battery 1 is adjusted within a range of ±10% of the specified adjusting voltage Vth. However, this voltage range is changed according to the specification.

(First Example of the Routine of Controlling the Regenerative Electric Power Discharging)

A description will now be given of the regenerative electric power discharging (or the regenerative discharging) control by the electric power system for a vehicle according to the embodiment with reference to FIG. 3.

Figure 3:
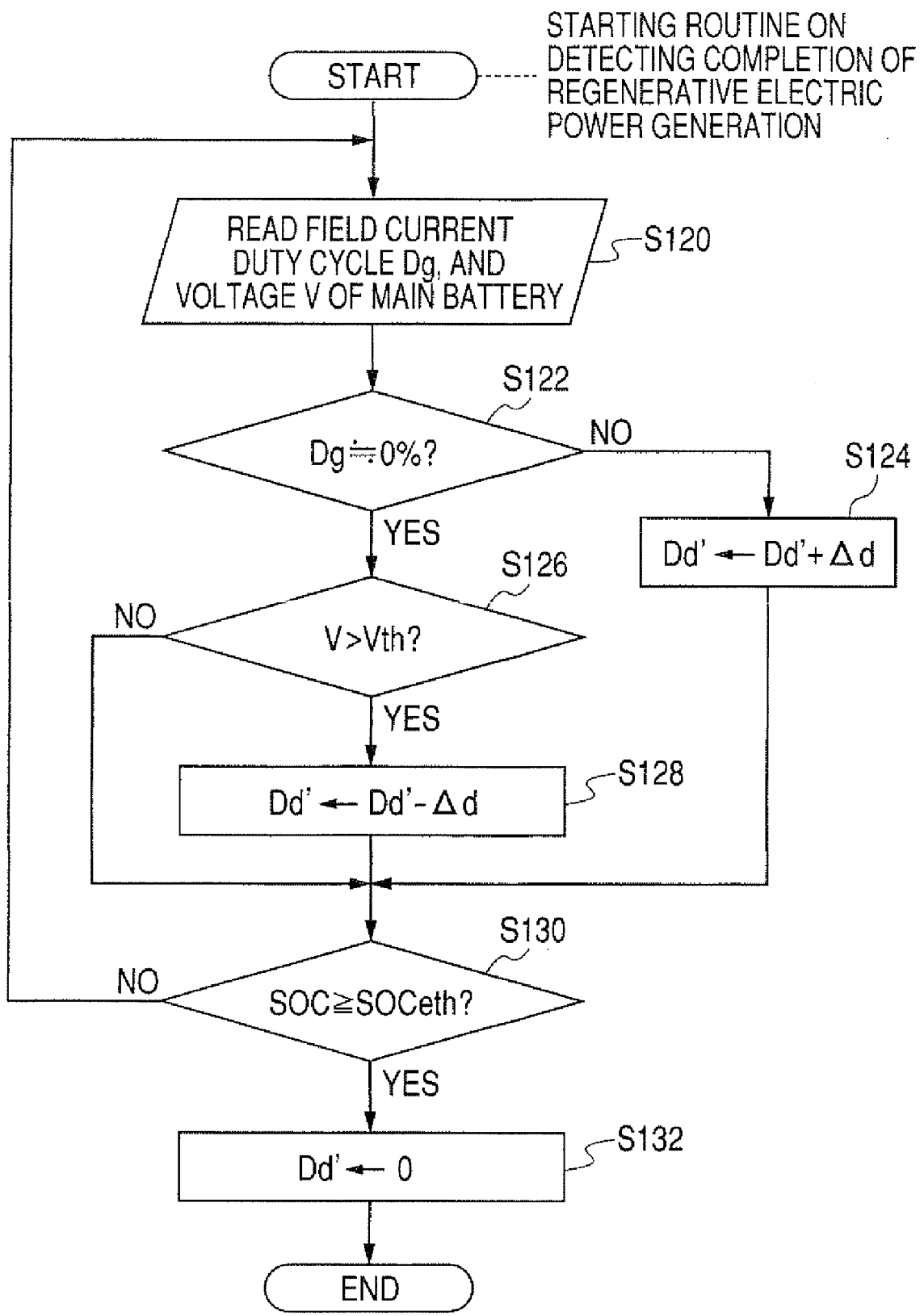
FIG. 3 is a flow chart of a routine of controlling a regenerative electric power discharging performed by the electric power system according to the embodiment of the present invention.

FIG. 3 is a flow chart of the routine of controlling the regenerative electric power discharging.

The routine of controlling the regenerative electric power discharging operation shown in FIG. 3 is initiated when the vehicle braking is completed or when the ECU 5 inputs a control signal corresponding to the completion of the vehicle braking.

First, the ECU 5 inputs the field current duty cycle Dg of the alternator 3 and the terminal voltage V of the main battery 1 (or the basic electric power system) (step S120). The alternator 3 regularly outputs the field current duty cycle Dg to the ECU 5.

The ECU 5 then judges whether or not the field current duty cycle Dg is almost equal to 0% (step S122).

When the judgment result at step S122 indicates that the field current duty cycle Dg has no value which is almost equal to 0%, the ECU 5 judges that the alternator 3 supplies the generated electric power to the electrical load 2 and the main battery 1. The ECU 5 then increases the PWM duty ratio Dd' of the built-in switching element of the DC-DC converter 4 as the electric power converter by ΔD (step S124). This PWM duty ratio Dd' indicates the duty when the DC-DC converter 4 performs a backward electric power transmission. The increment of the PWM duty ratio Dd' increases the amount of the electric power transmitted in the backward direction by the DC-DC converter 4, and thereby increases the terminal voltage V of the main battery 1 (or of the basic electric power system). The alternator 3 decreases the field current duty cycle Dg.

When the judgment result indicates that the field current duty cycle Dg is equal to or almost equal to 0% (step S122), the ECU 5 judges that the alternator 3 has already stopped in its operation. The ECU 5 then judges whether or not the voltage V of the basic power source system is larger than its specified adjusting voltage Vth (step S126).

When the judgment result indicates that the voltage V of the basic electric power source is larger than the specified adjusting voltage Vth (step S126), the ECU 5 judges that the sub battery 7 transmits an excess of the electric power to the basic electric power system. The ECU 5 then decreases the PWM duty ratio Dd' of the built-in switching element of the DC-DC converter 4 by a specified value ΔD in order to control the DC-DC converter 4 to decrease the electric power transmitted in the backward direction (step S128). The operation flow goes to step S130.

The ECU 5 controls the DC-DC converter 4 so that decreasing the PWM duty ratio Dd' decreases the electric power transmitted in the backward direction, and increasing the PWM duty ratio Dd' increases the electric power transmitted in the backward direction.

Decreasing the electric power transmitted in the backward direction maintains the voltage V of the electric power system to be the specified adjusting voltage Vth.

On the other hand, when the judgment result indicates that the voltage V of the basic electric power source is not more than the specified adjusting voltage Vth (step S126), the ECU 5 judges that it is not necessary to decrease the magnitude of the electric power to be transmitted in the backward direction because the electric power transmitted in the backward direction is not any excess value (step S128). The operation flow then goes to step S130.

In step S130, the ECU 5 judges whether or not the state of charge (SOC) of the sub battery 7 reaches the minimum value SOCeth. When the judgment result indicates that the SOC of the sub battery 7 has already reached the minimum value SOCeth, the ECU 5 sets the PWM duty ratio Dd' of the built-in switching element of the DC-DC converter 4 to zero in order to stop the electric power transmission in the backward direction (step S132). The ECU 5 then completes the routine shown in FIG. 3.

On the other hand, when the judgment result indicates that the SOC of the sub battery 7 does not reach the minimum value SOCeth, the operation flow returns to step S120. The regenerative electric power discharging control is then restarted.

By the way, the regenerative electric power discharging control has a possibility that the voltage V of the electric power system becomes lower than the specified adjusting voltage Vth (step S126). In this case, because the field current duty cycle Dg of the alternator 3 is increased by the feedback control of the field current duty cycle Dg of the alternator 3 as mentioned before, the ECU 5 adjusts the terminal voltage V of the main battery 1 to be the specified adjusting voltage Vth.
(Second Example of the Electric Power Generation Control Using a Regenerative Brake During a Vehicle Speed Reduction)

Figure 4:
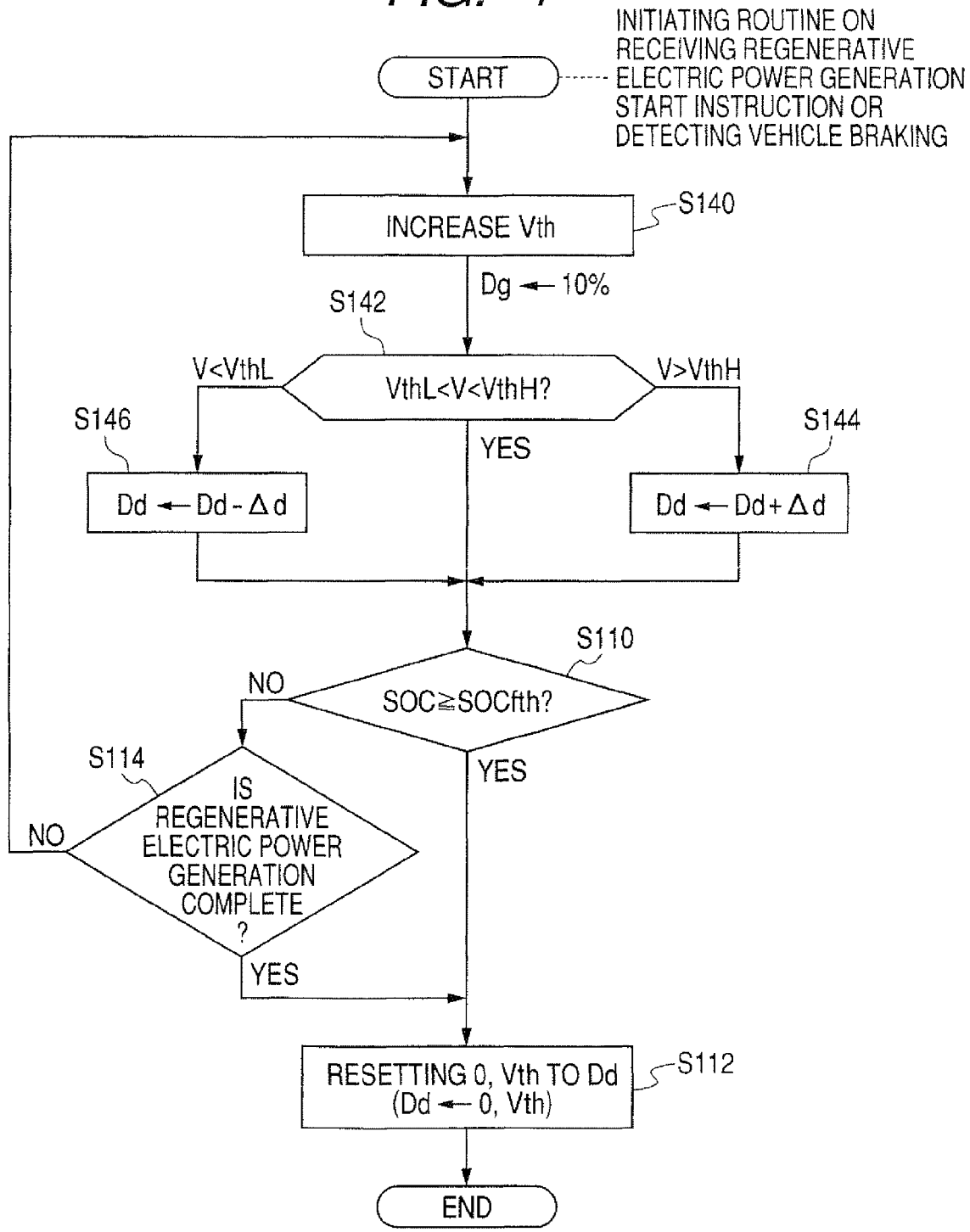
FIG. 4 is a flow chart of another routine of controlling the regenerative electric power generation using a regenerative brake during a vehicle speed reduction performed by the electric power system according to the embodiment of the present invention.

FIG. 4 is a flow chart showing another example of the routine of controlling the regenerative electric power generation using a regenerative brake when a vehicle speed is reduced.

First, the routine of controlling the regenerative electric power generation shown in FIG. 4 is initiated by inputting a vehicle braking control signal or an instruction signal to start the regenerative electric power generation. This instruction signal is determined by another routine (not shown) based on the vehicle braking control signal.

The ECU 5 increases the adjusting voltage Vth to be supplied to the alternator 3 by a specified value, and uses the increased one as a new adjusting voltage Vth for the regenerative electric power generation (step S140). In this example, the field current duty cycle Dg of the alternator 3 is always 100% in spite of the magnitude of the voltage V of the basic electric power source.

Next, the ECU 5 compares the voltage V of the basic electric power source with the specified low threshold value VthL and the specified high threshold value VthH (step S142).

In the embodiment, the specified low threshold value VthL is smaller than the specified adjusting voltage Vth in the normal electric power generation by ΔV and the specified high threshold value VthH is higher than the specified adjusting voltage Vth in the normal electric power generation by ΔV.

When judging that the voltage V of the basic electric power source is higher than the specified high threshold value VthH, the ECU 5 judges that the DC-DC converter 4 transmits a small magnitude of the electric power in the forward direction, and increases the PWM duty ratio Dd of the built-in switching element of the DC-DC converter 4 by Δd (step S144).

On the other hand, when judging that the voltage V of the basic electric power source is lower than the specified high threshold value VthL, the ECU 5 judges that the DC-DC converter 4 transmits a large magnitude of the electric power in the forward direction, and decreases the PWM duty ratio Dd of the built-in switching element of the DC-DC converter 4 by Δd (step S146).

When judging that the voltage V of the basic electric power source is not less than the specified low threshold value VthL and not more than specified high threshold value VthH, the ECU 5 judges that the PWM duty ratio Dd of the built-in switching element of the DC-DC converter 4 is an optimum value. The operation flow goes to step S110.

The operation of steps S112 and S114 after step S110 are equal to the operation of those steps S112 and S114 in the first example shown in FIG. 2 excepting the following operation.

In step S112 shown in FIG. 4, the new adjusting voltage Vth which has been temporarily increased in step S140 is reset to the original value.

The above routine shown in FIG. 4 can perform the same operation of the routine shown in FIG. 2.
(Second Example of the Regenerative Electric Power Discharging Control)

Figure 5:
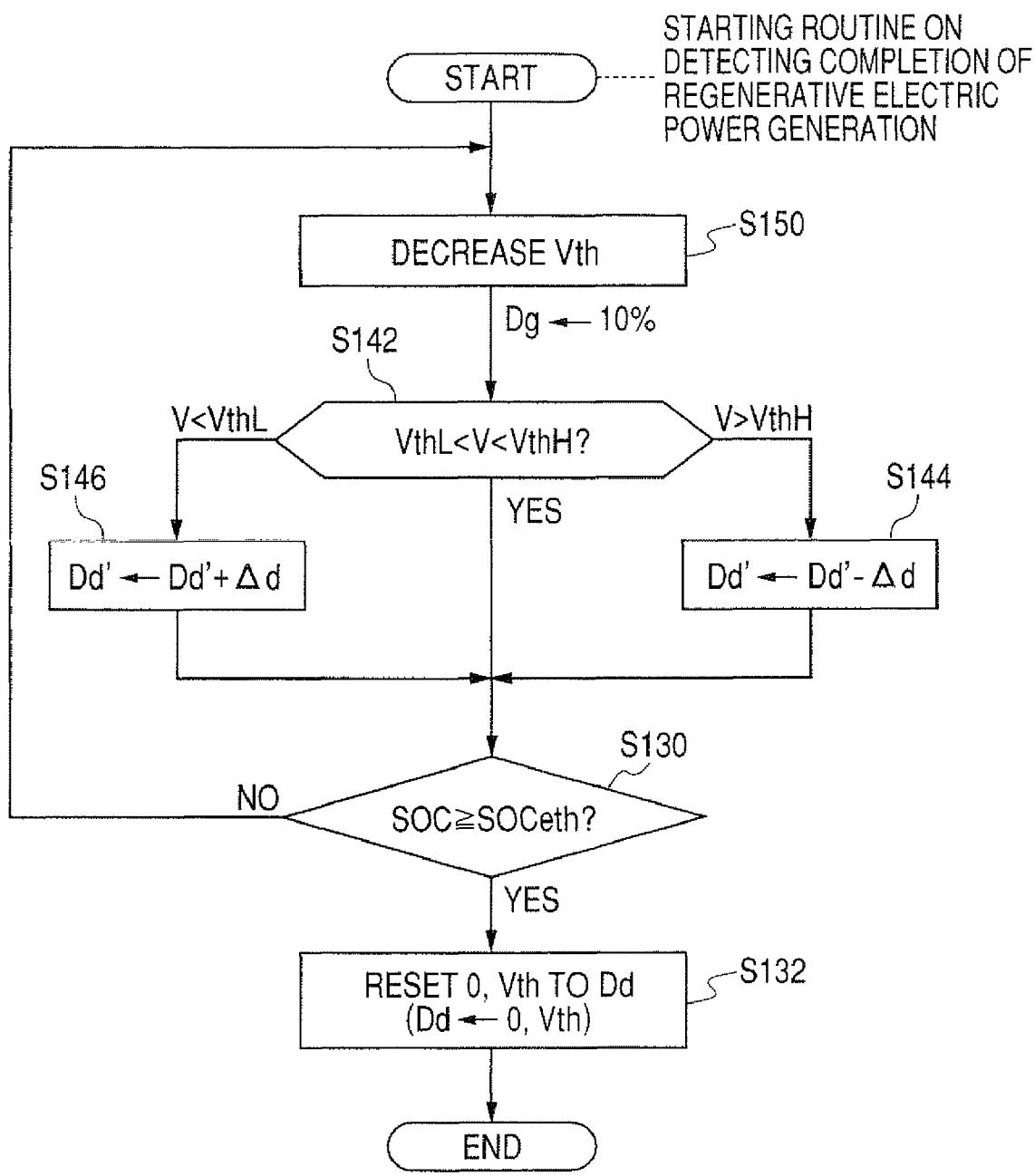
FIG. 5 is a flow chart of another routine of controlling the regenerative electric power discharging performed by the electric power system according to the embodiment of the present invention.

FIG. 5 is a flow chart of another routine of controlling the regenerative electric power discharging by the electric power system according to the embodiment of the present invention;

The routine of controlling the regenerative electric power discharging shown in FIG. 5 is initiated when the vehicle braking state is completed or when the ECU 5 inputs a control signal corresponding to the completion of the vehicle braking state.

First, the ECU 5 decreases the specified adjusting voltage Vth to be output to the alternator 3 by a specified amount. The decreased one is used as a new adjusting voltage for the regenerative electric power discharging (step S150). In this example, the field current duty cycle Dg of the alternator 3 is always 0% in spite of the magnitude of the voltage V of the voltage V of the basic electric power source.

Next, the ECU 5 compares the voltage V of the basic electric power source with the specified low threshold value VthL and the specified high threshold value VthH (step S142). In the embodiment, the specified low threshold value VthL is smaller than the specified adjusting voltage Vth in the normal electric power generation by ΔV, and the specified high threshold value VthH is higher than the specified adjusting voltage Vth in the normal electric power generation by ΔV.

When judging that the voltage V of the basic electric power source is higher than the specified high threshold value VthH, the ECU 5 judges that the DC-DC converter 4 transmits a large magnitude of the electric power in the backward direction, and decreases the PWM duty ratio Dd' of the built-in switching element of the DC-DC converter 4 by Δd' (step S144).

On the other hand, when judging that the voltage V of the basic electric power source is lower than the specified low threshold value VthL, the ECU 5 judges the electric power transmitted in the backward direction is too small, and increases the PWM duty ratio Dd' of the built-in switching element of the DC-DC converter 4 by Δd (step S146).

When judging that the voltage V of the basic electric power source is not less than the specified low threshold value VthL and not more than specified high threshold value VthH, the ECU 5 judges that the PWM duty ratio Dd of the built-in switching element of the DC-DC converter 4 is an optimum value. The operation flow goes to step S130.

The operation after step S130 is equal to that after step S130 in the first example shown in FIG. 3 excepting the following operation.

In step S132 shown in FIG. 3, the new adjusting voltage Vth which has been temporarily decreased in step S150 is reset to the original value.

The above routine shown in FIG. 5 can perform the same operation of the routine shown in FIG. 3.

(First Modification)

As described before in detail, the control device in the electric power system for a vehicle according to the embodiment of the present invention controls so that the sub battery 7 is charged during the regenerative electric power generation with the regenerative electric power which is equal to the residual generated electric power of the basic electric power system, and the battery 7 then rapidly discharges its stored electric power while maintaining the voltage V of the basic electric power system to the specified adjusting voltage Vth using a simple routine to control the PWM duty ratio Dd of the built-in switching element of the DC-DC converter 4 while directly or indirectly maintaining the voltage V of the basic electric power source to the specified adjusting voltage Vth.

There are various types of available control signals and functional values based on those control signals other than the adjusting voltage Vth and the voltage V of the basic power source system which the ECU 5 receives. For example, there is a field current duty cycle Dg of the alternator 3 as one of those available control signals to be input to the ECU 5. It is possible to obtain the essential same effects of the routines shown in FIG. 2 to FIG. 5 as mentioned before by performing the control routines using those various types of available control signals. This is within a scope of the technical field according to the present invention.

(Another Modification)

In the embodiments described before, the ECU 5 performs the two routines, namely, the regenerative electric power generation (or the regenerative generation) and the regenerative electric power discharging (or the regenerative discharging). The present invention is not limited by those routines. For example, the regulator of the alternator 3, a combination of the ECU 5 and the regulator of the alternator 3, or a battery controller capable of managing the main and sub batteries can perform those routines for the regenerative electric power generation and discharging. For example, the control device used in the electric power system for a vehicle according to the present invention is not limited by using the ECU 5. It is possible that the control device in the electric power system according to the present invention is a combination of the ECU 5 and the regulator of the alternator 3.

(For Reference)

Figure 6:
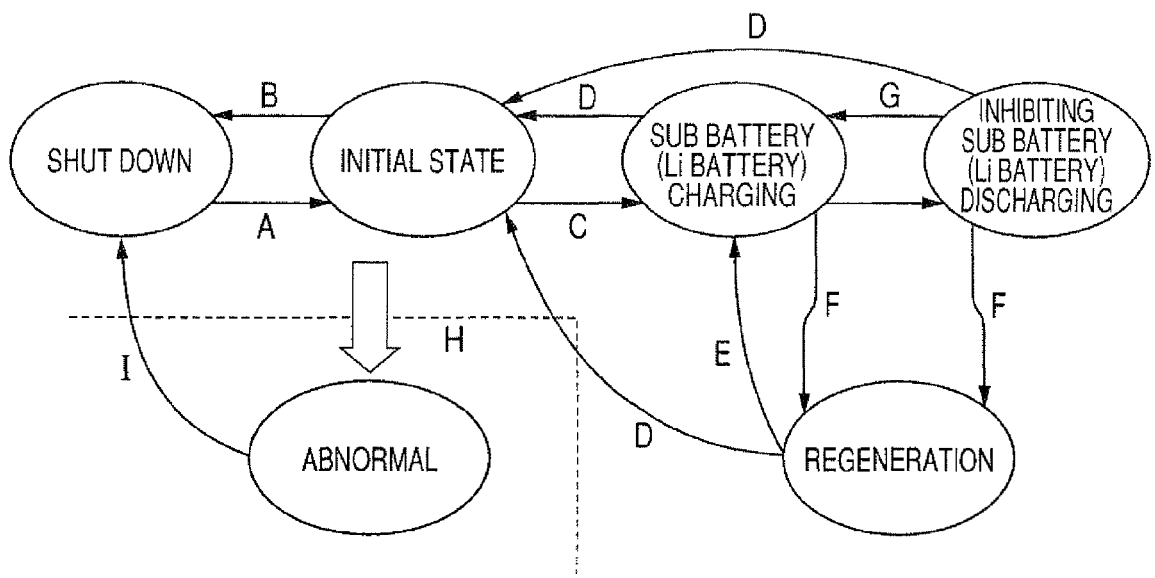
FIG. 6 is a state transition diagram showing the operation of an electric power converter (or a DC-DC converter) for a bi-directional transmission in the electric power system according to the embodiment of the present invention.
Figure 7:
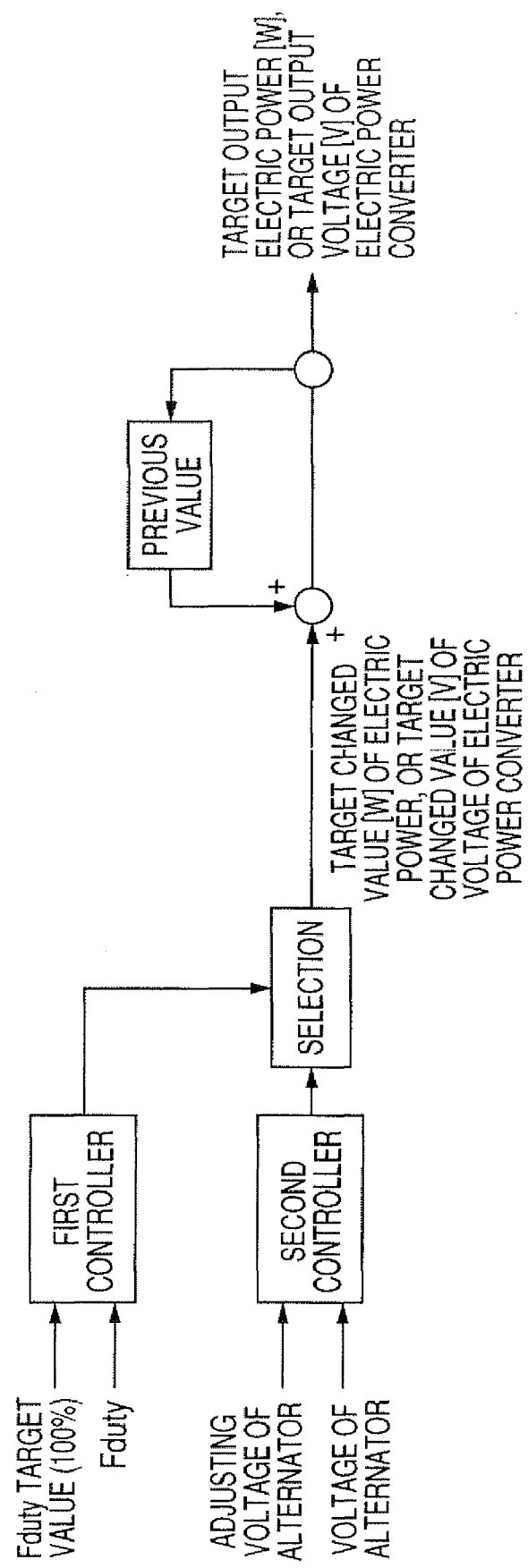
FIG. 7 is a block diagram of the electric power system according to the embodiment of the present invention, which shows an example of controlling the regenerative electric power generation.
Figure 8:
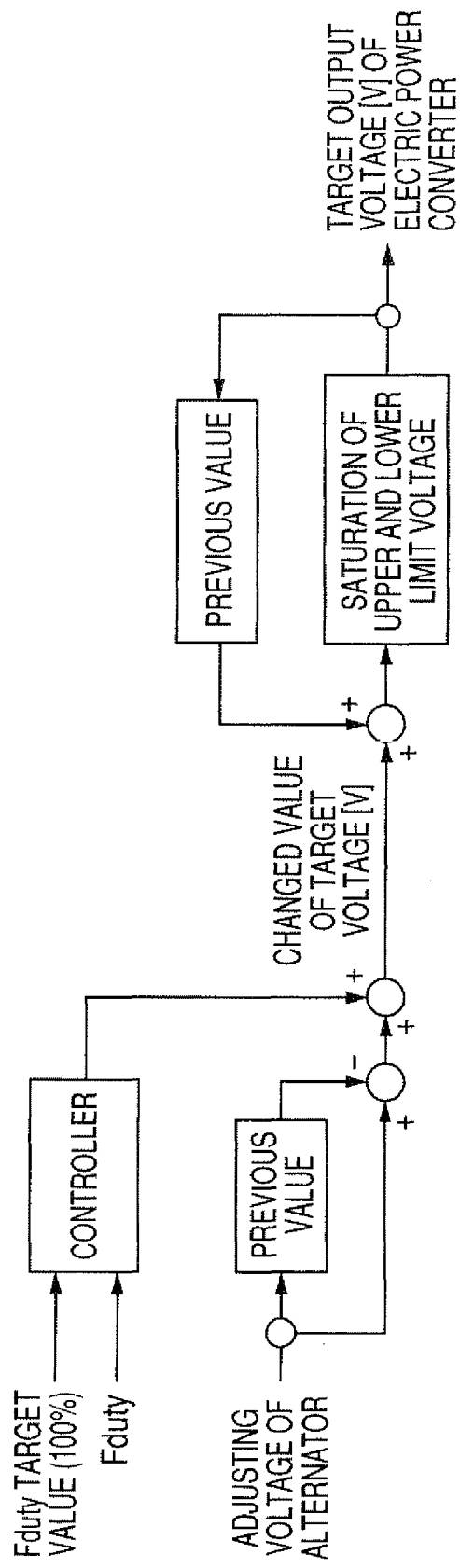
FIG. 8 is a block diagram of the electric power system according to the embodiment of the present invention, which shows an example of controlling the regenerative electric power discharging.

FIG. 6 shows a state transition diagram of the DC-DC convertor in the control operation of the electric power system according to the embodiment of the present invention. FIG. 6 is an example of the state transition diagram showing the operation of the DC-DC convertor 4 as the electric power converter for a bi-directional electric power transmission. FIG. 7 is a block diagram of the electric power system according to the embodiment of the present invention, which shows an example of controlling the regenerative electric power generation. The electric power system shown in FIG. 7 uses two controllers, the first controller and the second controller in order to select parameters to perform the feedback control. FIG. 8 is a block diagram of the electric power system according to the embodiment of the present invention, which shows an example of controlling the regenerative electric power discharging for reference.

FEATURES AND EFFECTS OF THE PRESENT INVENTION

In the electric power system for a vehicle as another aspect of the present invention, during the regenerative electric power generation, the control device controls the feedback control of the electric power converter using a forward electric power transmission instruction so that the field current control switch in the alternator maintains the field current duty cycle to be approximately 100% while the terminal voltage of the main storage device is within the specified voltage range which includes the adjusting voltage. The range of the "approximate 100%" indicates the range of 95 to 100%.

As mentioned before in detail, the operation of the alternator is controlled under the feedback control to converge the voltage of the basic electric power system to a target voltage. The electric power system according to the present invention uses this feedback control for the alternator in order to allow the electric power converter to perform a simple control operation during the regenerative electric power generation.

That is, during the regenerative electric power generation, increasing the magnitude of the electric power in the forward electric power transmission by the electric power converter increases the magnitude of the field current duty cycle of the alternator in order to compensate a voltage drop of the basic electric power system. On the other hand, decreasing the magnitude of the electric power in the forward electric power transmission by the electric power converter decreases the magnitude of the field current duty cycle of the alternator in order to compensate a voltage rise of the basic electric power system.

When the duty ratio of the electric power converter is controlled to have the value of approximately 100% in order to maintain approximately 100% of the field current duty cycle of the alternator, where the alternator maintains the voltage of the main storage device to have the adjusting voltage, the residual electric power becomes equal to the electric power which is transmitted in the forward electric power transmission by the electric power converter. As a result, the terminal voltage of the main storage device thereby maintains the adjusting voltage. In the above explanation, the residual electric power is obtained by subtracting form the electric power generated by the alternator the electric power to be discharged from the main storage device and the electric power to be consumed by the electrical loads.

It is thereby possible to provide the electric power system for a vehicle with a simplified control structure capable of performing the regenerative electric power generation using the maximum residual electric power.

In the electric power system as another aspect of the present invention, during the regenerative electric power discharging, the control device controls the feedback control of the electric power converter using a backward electric power transmission instruction so that the field current control switch in the alternator maintains the field current duty cycle to be approximately zero percent (0%) while the terminal voltage of the main storage device is within the specified voltage range which includes the adjusting voltage. The range of the "approximate zero % (0%)" indicates the range of zero (0%) to 5%.

As mentioned above, the operation of the alternator is controlled under the feedback control to converge the voltage of the basic electric power system to the target voltage.

The electric power system according to the present invention uses this feedback control for the alternator in order to allow the electric power converter to perform a simple control operation during the regenerative electric power discharging.

That is, during the regenerative electric power discharging, increasing the magnitude of the electric power in the backward electric power transmission by the electric power converter decreases the magnitude of the field current duty cycle of the alternator in order to compensate a voltage rise of the basic electric power system. On the other hand, decreasing the magnitude of the electric power in the backward electric power transmission by the electric power converter increases the magnitude of the field current duty cycle of the alternator in order to compensate a voltage drop of the basic electric power system.

When the duty ratio of the electric power converter is controlled to have the value of approximately zero percent (0%) in order to maintain approximately zero percent (0%) of the field current duty cycle of the alternator, where the alternator maintains the voltage of the main storage device to have the adjusting voltage, it is possible to complete a rapid discharging of the generative electric power stored in the sub storage device while the voltage of the basic electric power system is maintained at an optimum level.

It is possible to provide the electric power system for a vehicle with a simplified control structure capable of recharging the sub storage device as fast as possible.

In the electric power system for a vehicle as another aspect of the present invention, during the regenerative electric power generation, the control device instructs the alternator to have the field current duty cycle of approximately 100%, and controls the feedback control of the electric power converter using a forward electric power transmission instruction so that the terminal voltage of the main storage device is within the specified voltage range.

During the regenerative electric power generation, the feedback control for the voltage of the basic electric power system using the field current duty cycle of the alternator is temporarily halted, and the field current duty cycle of the alternator is forcedly set to the value of 100% in order to increase the electric power generated by the alternator to the maximum value. Further, the control device performs the feedback control of the duty ratio of the electric power converter so that a difference between the terminal voltage of the main storage device and the adjusting voltage becomes zero.

That is, the feedback control to maintain the voltage of the basic electric power system (or the voltage of the main storage device) is temporarily performed by the electric power converter instead of the alternator during the regenerative electric power generation.

When the state of charge (SOC) is shifted to its maximum value by the voltage fluctuation of the sub storage device or when the regenerative electric power generation stops by the completion of the vehicle speed reduction, the control device re-starts the feedback control for the field current duty cycle. This can obtain the same effect of the various embodiment of the present invention.

In the electric power system for a vehicle as another aspect of the present invention, during the regenerative electric power discharging, the control device instructs the alternator to have the field current duty cycle of approximately zero percent (0%), and controls the feedback control of the electric power converter using a backward electric power transmission instruction so that the terminal voltage of the main storage device is within the specified voltage range.

During the regenerative electric power discharging, the feedback control for the voltage of the basic electric power system using the field current duty cycle of the alternator is temporarily halted, and the field current duty cycle of the alternator is forcedly set to the value of zero percent (0%) in order to minimize the electric power generated by the alternator to the minimum value. Further, the control device performs the feedback control of the duty ratio of the electric power converter so that a difference between the terminal voltage of the main storage device and the adjusting voltage becomes zero.

That is, the feedback control to maintain the voltage of the basic electric power system (or the voltage of the main storage device) is temporarily performed by the electric power converter instead of the alternator during the regenerative electric power generation.

When the state of charge (SOC) is shifted to its minimum value by the voltage fluctuation of the sub storage device or when the regenerative electric power discharging stops, the control device re-starts the feedback control for the field current duty cycle. This can obtain the same effect of the various embodiment of the present invention.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power system for a vehicle performing a regenerative electric power generation using a regenerative brake during a vehicle speed reduction, and performing a regenerative electric power discharging after the vehicle speed reduction, the electric power system comprising:
    an alternator equipped with a rectifier and a regulator having a field current control switch, which is driven to generate an electric power by a rotary power supplied from an internal combustion engine of a vehicle, and an output voltage of which is converged to an adjusting voltage by a feedback control of a field current duty cycle as a duty ratio of the field current control switch;
    a first storage device, to be charged with the electric power generated by the alternator, and which discharges the electric power to electrical loads, wherein the first storage device is directly connected to the alternator and the electrical loads;
    a second storage device, to be charged with a regenerative electric power which is generated by the alternator during a vehicle speed reduction or a vehicle braking, and which discharges the stored regenerative electric power after completion of the vehicle speed reduction;
    an electric power converter for a bi-directional electric power transmission which transmits the electric power between the first storage device and the second storage device which are electrically connected through the electric power converter; and
    a control device which controls operation of the alternator and the electric power converter so that
    the second storage device is charged with the regenerative electric power generated by the alternator using the regenerative brake during the vehicle speed reduction, and the second battery discharges the stored regenerative electric power to the electrical loads through the electric power converter after completion of the vehicle speed reduction, wherein
    during the regenerative electric power generation, the control device instructs the electric power converter to transmit a residual generated electric power in a forward electric power transmission from the alternator to the second storage device while a terminal voltage of the first storage device is maintained within a specified voltage range, in which the residual generated electric power is obtained by subtracting an electric power to be consumed by the electrical loads and an electric power with which the first storage device is charged from a maximum generated electric power of the alternator, and during the regenerative electric power discharging, the control device instructs the electric power converter to transmit the electric power in a backward electric power transmission from the second storage device to the first storage device so that the electric power generated by the alternator is not more than a specified value while the terminal voltage of the first storage device is maintained within a specified voltage.

2. The electric power system for a vehicle according to claim 1, wherein
during the regenerative electric power generation, the control device controls the feedback control of the electric power converter using a forward electric power transmission instruction so that the field current control switch in the alternator maintains the field current duty cycle to be approximately 100% while the terminal voltage of the first storage device is within the specified voltage range which includes the adjusting voltage.

3. The electric power system for a vehicle according to claim 1, wherein
during the regenerative electric power discharging, the control device controls the feedback control for the electric power converter using a backward electric power transmission instruction so that the field current control switch in the alternator maintains the field current duty cycle to be approximately zero percent (0%) while the terminal voltage of the first storage device is within the specified voltage range which includes the adjusting voltage.

4. The electric power system for a vehicle according to claim 1, wherein
during the regenerative electric power generation, the control device instructs the alternator to have the field current duty cycle of approximately 100%, and controls the feedback control of the electric power converter using a forward electric power transmission instruction so that the terminal voltage of the first storage device is within the specified voltage range.

5. The electric power system for a vehicle according to claim 1, wherein
during the regenerative electric power discharging, the control device instructs the alternator to have the field current duty cycle of approximately zero percent (0%), and controls the feedback control of the electric power converter using a backward electric power transmission instruction so that the terminal voltage of the first storage device is within the specified voltage range.

6. The electric power system for a vehicle according to claim 2, wherein
the approximate 100% of the field current duty cycle is within a range of 95 to 100%.

7. The electric power system for a vehicle according to claim 3, wherein
the approximate zero percent (0%) of the field current duty cycle is within a range of zero to 5%.

8. The electric power system for a vehicle according to claim 4, wherein
the approximate 100% of the field current duty cycle is within a range of 95 to 100%.

9. The electric power system for a vehicle according to claim 5, wherein
the approximate zero percent (0%) of the field current duty cycle is within a range of zero to 5%.

10. The electric power system for a vehicle according to claim 1, wherein the first storage device is a main storage device and the second storage device is a sub storage device.

11. The electric power system for a vehicle according to claim 1, wherein the vehicle is a non-hybrid vehicle.

* * * * *